G. HILGENSTOCK.
PROCESS OF OBTAINING AMMONIA FROM GAS.
APPLICATION FILED SEPT. 15, 1910.
1,098,900.
Patented June 2, 1914.
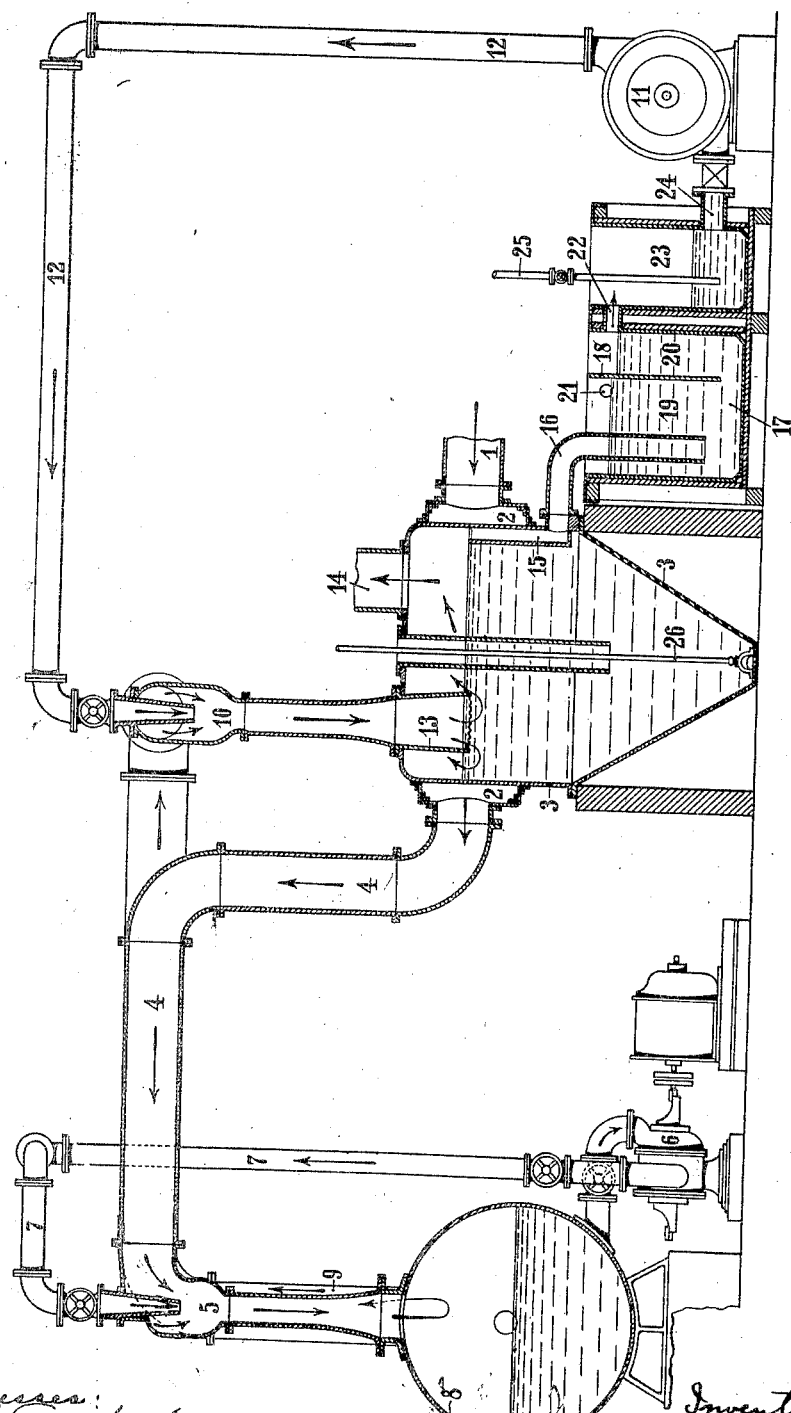

UNITED STATES PATENT OFFICE.

GUSTAV HILGENSTOCK, OF DAHLHAUSEN-ON-THE-RUHR, GERMANY.

PROCESS OF OBTAINING AMMONIA FROM GAS.

1,098,900.  Specification of Letters Patent.  Patented June 2, 1914.

Application filed September 15, 1910. Serial No. 582,114.

*To all whom it may concern:*

Be it known that I, GUSTAV HILGENSTOCK, a subject of the King of Prussia, Emperor of Germany, and a resident of Dahlhausen-on-the-Ruhr, Westphalia, Kingdom of Prussia, Germany, have invented certain new and useful Improvements in the Process of Obtaining Ammonia from Gas, of which the following is a specification.

According to my improved process, the gas is freed from the greater portion of its tar, while at or somewhat above its dew point temperature, and is then contacted with acid or acid lye, maintained at a temperature above the dew point of such gas, by heat taken from the gas itself before such gas has been subjected to the tar removal treatment. By maintaining the ammonia-absorbing medium at a temperature above the dew point of the gas, I avoid condensation in such ammonia-absorbing medium of the moisture carried by the gas, and so avoid dilution of such ammonia-absorbing medium by condensed moisture.

The accompanying drawing illustrates more or less diagrammatically and in vertical section, apparatus for carrying out my said process. In said apparatus I have illustrated, as means for removal of the tar, a device of the injector type, wherein the gas is washed with tar or with water containing tar; such tar extracting device being particularly efficient for the purpose; and I have further illustrated, as means for contacting the gas with the ammonia-absorbing medium, a tank containing the ammonia-absorbing medium, and surrounded by a jacket through which the gas flows on its way to the tar extractor, and an injector to which the ammonia-absorbing medium is supplied by suitable means, and which mingles such ammonia-absorbing medium with the gas coming from the tar extractor; the mixture of the ammonia-absorbing medium and gas being thence delivered into said tank at a point below the level of the liquid therein.

In the drawing, 3 designates the tank containing the ammonia-absorbing medium—which medium is customarily an acid lye, 2 designates the jacket surrounding this tank 3, and 1 designates the gas main through which the gas is delivered to said jacket. After leaving this jacket the gases are led through pipe 4 to the tar extractor 5; the particular extractor shown being a tar injector; this tar injector receives the washing liquid by means of the pressure pipe 7 of the tar pump 6, the latter being connected with the tar-receiving tank 8. In the tar-extractor 5 the hot gases are freed completely from tar by means of the injected tar and they are then conducted through the upper clear space of the tank 8 and pipe 9 to the mixer 10, which is shaped like an injector. The acid or acid lye which is necessary for its operation is brought by centrifugal pump 11 through pressure pipe 12. In the injector 10 there will be an intimate action between the absorbing liquid and the gas; the ammonia in the gas combines with the acid of the liquid and goes with the latter to the receiving tank 3. The gas is forced through a serrated pipe dipping in the washing liquid whereby it is washed a second time and finally leaves the vessel free of ammonia by way of nozzle 14 to be burned.

Inside of the vessel 3 the lye is kept on a fixed level by means of the overflow 15, which in turn connects with pipe 16, the latter being sealed in the overflowing lye in the tank 17. Tank 17 is divided by a partition 18 into two compartments 19 and 20, which connect with one another underneath the partition 18. From the vessel 3 not only lye but also small quantities of tar or tarry foam flow off; the tar having a lesser specific gravity than the lye ascends to the surface in the chamber 19, it is ladled out or overflows through pipe 21. The lye free of tar passes underneath the partition into the chamber 20 and from there through opening 22 into the vessel 23. By means of suction pipe 24 the latter is connected to the centrifugal pump 11 and the lye is continuously fed to the injector or ammonia separator 10. The constant renewal of the acid in the lye takes place in the vessel 23 through pipe 25. The ammonia salt which is eliminated in the tank 3 and collects at its bottom is removed by means of the ejector 26 and dried in a centrifugal machine.

For various practical reasons the separation of tar from the gas is best conducted at a temperature at or only slightly above the dew point of the gas—that is to say, at or slightly above the temperature at which the principal part of the moisture carried by the gas condenses. Hence in the operation of tar extractors such as that illustrated, the temperature of the washing liquor is customarily regulated so that the extraction of the tar is conducted at a temperature only slightly above the dew point of the gas. If the gas at such temperature were then delivered into tank 3, and if the liquid in that tank were at a temperature at or about the dew point of the gas, considerable moisture carried by the gas would be separated out and would be absorbed by the liquid in tank 3, so diluting such liquid. Such dilution I avoid by passing the hot gases through the jacket 2 before such gases reach the tar extractor; and thereby I maintain the temperature of the ammonia-absorbing medium well above the dew point of the gas, and so avoid dilution of such ammonia-absorbing medium.

What I claim is:

1. The process of extracting ammonia from gases resulting from distillation of carbonaceous material, which comprises removing tar from such gases at a temperature near the dew point for contained water vapor of such gases, and then contacting the gases with an ammonia-absorbing medium, and maintaining such ammonia-absorbing medium at a temperature well above such dew point of the gases, by passing said gases, while hot, and before the tar removal treatment, into heating proximity to the ammonia-absorbing medium.

2. The process of extracting ammonia from gases resulting from distillation of carbonaceous material, which comprises removing tar from such gases at a temperature near the dew point for contained water vapor of such gases, by washing said gases with tar or tarry liquor, and thence passing said gases into an ejector and there mingling them with injected acid or acid lye maintained at a temperature well above such dew point of such gases, and separating the ammonia-carrying lye from the remaining gases.

In testimony whereof I have signed this specification in the presence of two subscribing witnesses.

GUSTAV HILGENSTOCK.

Witnesses:
ANNA REINHOLD,
WILHELMINE SCHÄFER.